United States Patent [19]
Gogan et al.

[11] Patent Number: 5,664,715
[45] Date of Patent: Sep. 9, 1997

[54] DETACHABLE LUGGAGE CARRIER

[75] Inventors: Donald Michael Gogan, Brookfield; Stephen Lloyd Galbraith; Geoffrey Thomas Williams, both of Mequon, all of Wis.

[73] Assignee: Harley-Davidson Motor Company, Milwaukee, Wis.

[21] Appl. No.: 504,919

[22] Filed: Jul. 20, 1995

[51] Int. Cl.[6] .................... B62J 7/00; B62J 9/00; B62J 11/00

[52] U.S. Cl. .......... 224/413; 224/418; 224/423; 224/441; 224/447; 280/288.4; 292/341.12

[58] Field of Search ................ 224/412, 413, 224/418, 420, 421, 423, 441, 445, 447, 454; 280/288.4; 296/63, 65.1; 180/219, 225; 297/325, 326; 292/341.12; 411/546, 367, 368

[56] References Cited

U.S. PATENT DOCUMENTS

| | | | |
|---|---|---|---|
| 4,032,189 | 6/1977 | Benavente et al. | 297/352 |
| 4,522,442 | 6/1985 | Takenaka | 224/413 |
| 4,759,580 | 7/1988 | Berlick, Jr. et al. | 296/65.1 |
| 4,773,693 | 9/1988 | Premji et al. | 296/65.1 |
| 4,826,057 | 5/1989 | Yamada | 224/412 |
| 4,993,731 | 2/1991 | Fuller | 280/202 |
| 5,443,239 | 8/1995 | Laporte | 296/65.1 |
| 5,465,882 | 11/1995 | Shinohara | 224/413 |
| 5,577,854 | 11/1996 | Jacob et al. | 411/546 |

OTHER PUBLICATIONS

Custom Chrome 1994 Catalog, pp. 623–624.
V–Twin 1993 Catalog, p. 511.
Harley–Davidson 1992 Accessories Catalog, pages.
Harley–Davidson 1993 Accessories Catalog, p. 20.
Harley–Davidson 1995 Parts and Accessories Catalog, pp. 41, 63, 73 and 82.
"Sissy Bars, Racks & Bags," from *Hot Road Bikes*, pp. 67–68, Jan., 1996.

*Primary Examiner*—Renee S. Luebke
*Assistant Examiner*—Timothy L. Maust
*Attorney, Agent, or Firm*—Michael, Best & Freidrich

[57] ABSTRACT

A luggage carrier assembly including a luggage carrier and a pair of latching mechanisms mounted on the luggage carrier for securing the luggage carrier to a motorcycle mount upon movement of the luggage carrier toward the mount. The luggage carrier includes a pair of side plates each having a recess engageable with the mount, and the latching mechanisms each include a latch member pivotally mounted on the side plates movable relative to the side plates between an unlatched position, in which the recesses are engageable and disengageable with the mount, and a latched position, in which the recess is held in engagement with the mount. The luggage carrier further includes a locking member movable relative to the latch member between an unlocked position, in which the latch member is movable between the latched and unlatched positions, and a locked position, in which the latch member is held in the latched position.

18 Claims, 6 Drawing Sheets

DETACHABLE LUGGAGE CARRIER

FIELD OF THE INVENTION

The present invention generally relates to the field of luggage carriers for motor vehicles and more particularly to a readily attachable and detachable luggage carrier for motorcycles.

BACKGROUND OF THE INVENTION

Luggage carriers are commonly secured on the backs of motorcycles to transport objects, such as suitcases, camping gear or tools. Luggage carriers commonly take the form of luggage racks, but can also include luggage compartments or other suitable articles for carrying objects.

Luggage carriers are typically designed to mount at rear mounting points on the back of a motorcycle. Sometimes, these rear mounting points are the same mounting points used to mount a sissy bar, in which case either a luggage carrier or a sissy bar can be used. In this regard, luggage racks and sissy bar are typically designed to be removable from the motorcycle so that the user can change from using a sissy bar to using a luggage carrier, and vice versa. A plurality of fasteners, such as screws or bolts, are typically utilized.

One disadvantage of using such fasteners is that they require the use of tools (e.g., wrenches and/or screwdrivers) to install and remove. Such tools may not always be readily available, particularly when the operator of the motorcycle is out on the road. In addition, even with the use of the proper tools, installing and removing such fasteners can be tedious and time-consuming. As a result, the motorcycle rider may be disinclined to install or remove the luggage carrier.

SUMMARY OF THE INVENTION

The present invention solves the above-noted problems by providing a luggage carrier assembly that can be installed onto and removed from a mounting means without the need for tools. The luggage carrier of the present invention generally includes a luggage support and a latching means for automatically securing the luggage carrier to the mounting means upon movement of the luggage carrier toward the mounting means.

In general terms, one aspect of the invention comprises a luggage carrier adapted to be installed on a motorcycle, and including means for releaseably supporting luggage, pivot means mounted on the luggage carrier for pivotally engaging a first mounting means on the motorcycle, latching means mounted on the luggage supporting means and spaced from the pivot means for engaging a second mounting means on the motorcycle and for automatically securing the luggage supporting means to the first and second mounting means upon pivotal movement of the luggage supporting means about the first mounting means and towards the second mounting means and into an operative position.

According to another aspect, the invention comprises a latching assembly including a pivotally mounted latching member and a locking member, the latching member having a latched position and an unlatched position, and the locking member having a locked and an unlocked position. The locking member is displaceable from its locked position to its unlocked positions and operative to move said latching member to its latched position upon engagement of said locking member with a mounting means, and means for returning said locking member to its locked position upon continued movement of the latching assembly toward the mounting means after contact therewith.

DETAILED DESCRIPTION

Figure 1:
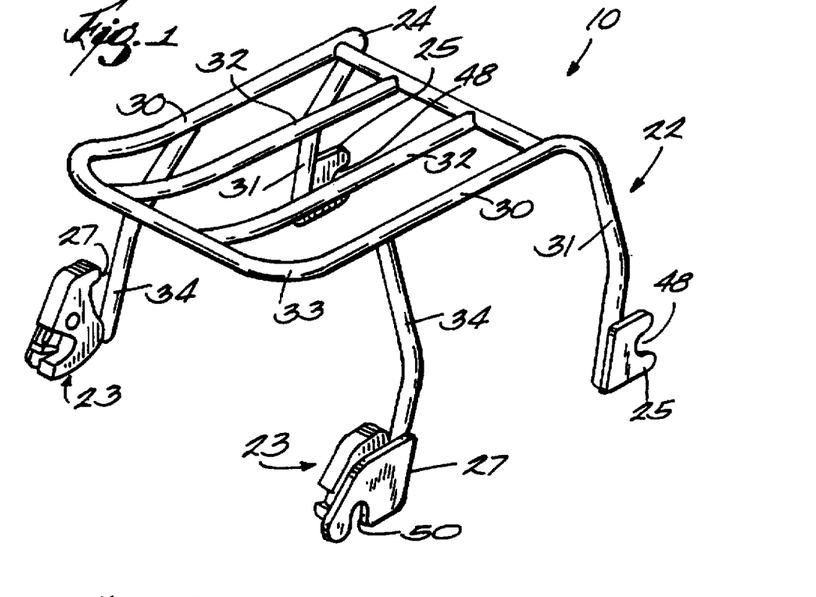
FIG. 1 is a perspective view of a luggage carrier assembly embodying the present invention.
Figure 2:
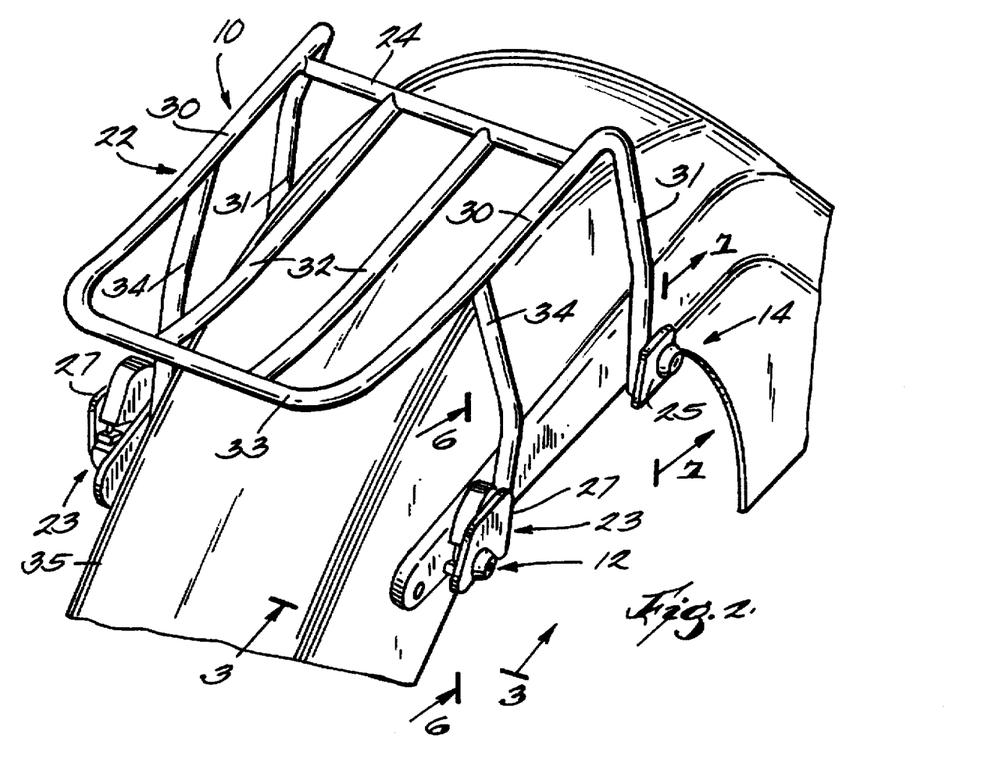
FIG. 2 is a perspective view of the luggage carrier assembly illustrated in FIG. 1 mounted on a motorcycle.
Figure 3:
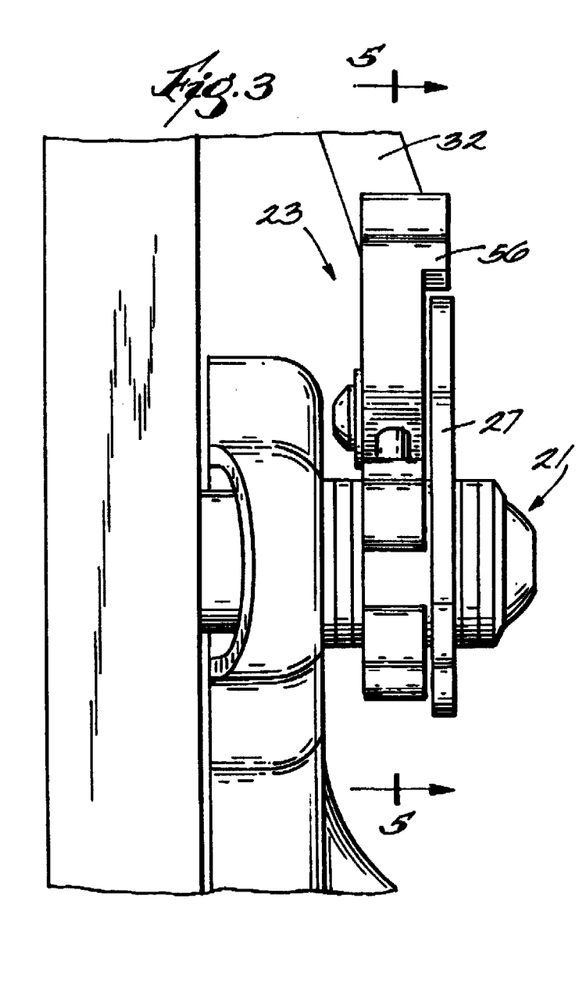
FIG. 3 is an enlarged rear view of a right side latch as viewed from line 3—3 in FIG. 2.

FIGS. 1 and 2 illustrate a luggage carrier assembly 10 embodying the present invention. The illustrated luggage carrier assembly 10 is adapted to be installed on a motorcycle having front and rear mounting means 14 and 12 for releaseably supporting a luggage carrier. The luggage carrier assembly 10 includes a luggage carrier 22 and a latching means consisting of latching assemblies 23 mounted on each of the lateral sides of the luggage carrier 22 for automatically securing the luggage carrier 22 to the rear mounting means 12 upon pivotal movement of the luggage carrier 22 about the front mounting means 14 and toward the rear mounting means 12. As used herein, the term "automatically" means that the latching means 23 is designed such that the luggage carrier 22 need only be pivoted toward the rear mounting means 12 in order to cause the latching means 23 to engage. That is, there is no need to manually move or release the latching means 23 in order to secure the luggage carrier 22 to the rear mounting means 12.

The illustrated luggage carrier 22 includes a luggage rack 24 and a base portion in the form of two front side plates 25 and two rear side plates 27 for supporting the luggage rack 24. The luggage rack 24 may take any convenient form and may include a generally horizontally oriented cargo support portion formed by an outer tube 30 shaped to define a generally U-shaped upper portion and a pair of depending legs 31, a pair of parallel center tubes 32 and an end tube 33 extending between the sides of tube 30. A pair of tubular rear legs 34 extend downwardly from the rear portion of tube 30 for support of the luggage carrier above the motorcycle's rear fender 35.

Figure 6:
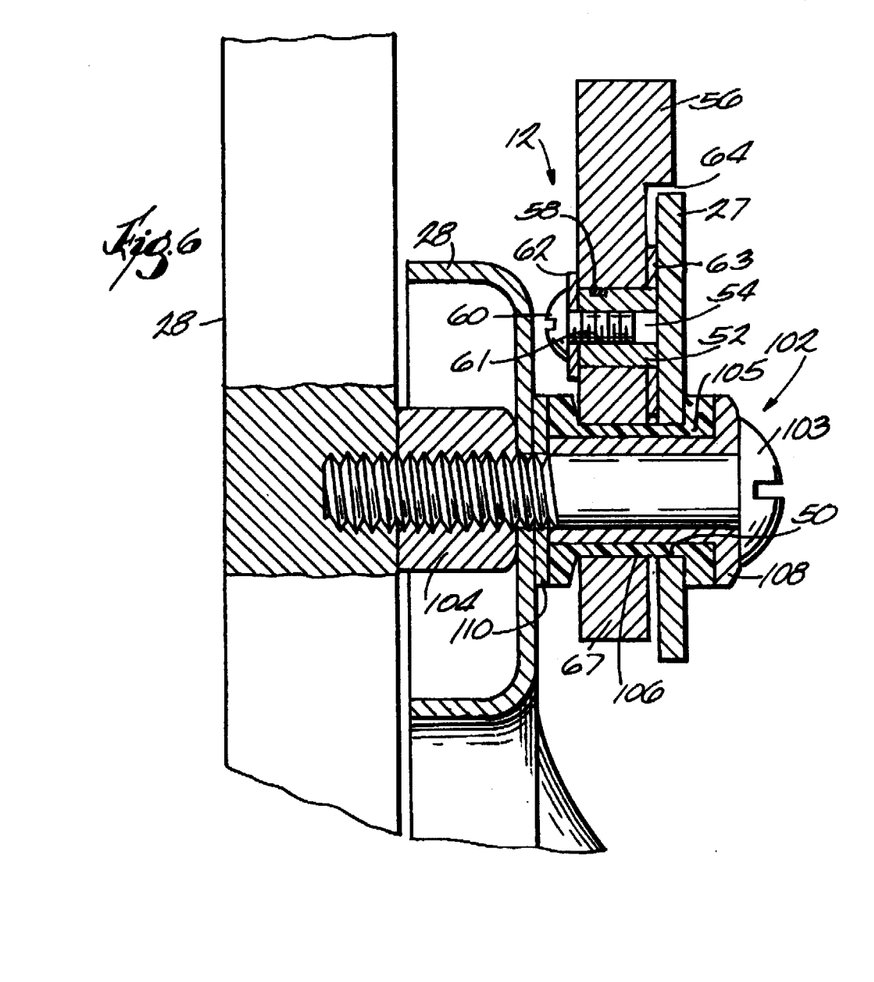
FIG. 6 is a section view of the ride side latch taken along line 6—6 in FIG. 2.

The side plates 25 and 27 are secured respectively to the lower ends of the legs 31 and 34 in any suitable manner, such as by welding and are generally vertically oriented relative to the motorcycle fender 35. The front side plates 25 each include a forwardly-facing, generally C-shaped front recess 48, and the rear side plates 27 each include a downwardly-facing inverted generally U-shaped rear recess 50. Referring to FIG. 6, a cylindrical pivot member 52 is secured to and extends laterally from an inside surface of each rear side plate 27. The pivot member 52 has a cylindrical outer surface for pivotally supporting the latching means 23, as described below.

Figure 5:
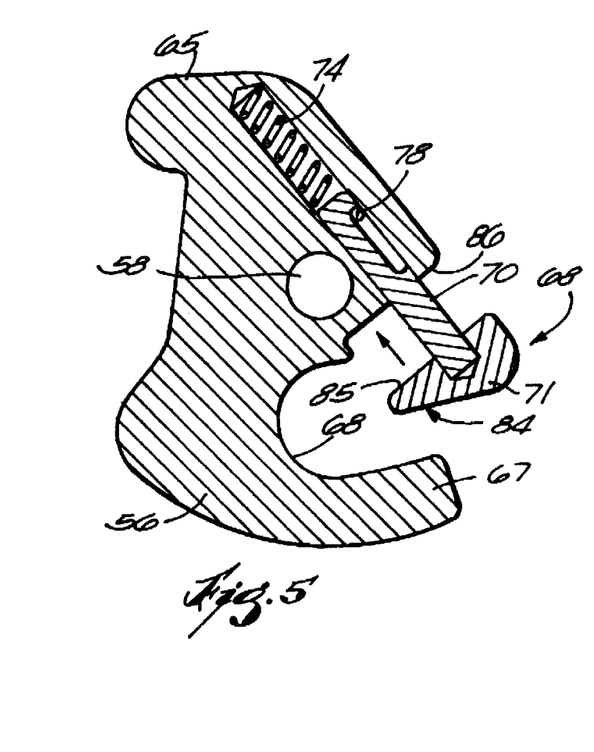
FIG. 5 is a section view of the right side latch taken along line 5—5 in FIG. 3 5

Each latching means 23 includes a latch member 56 pivotally mounted on the rear side plates 27 for movement between an unlatched position, in which the rear side plates 27 are engageable and disengageable with the rear mounting means 12, and a latched position, in which the rear side plates 27 are held in engagement therewith. Each latching means 23 further includes a locking device 68 (FIG. 5) movable relative to the latch member 56 between an unlocked position, in which the latch member 56 is movable between its latched and unlatched positions, and a locked position, in which the latch member 56 is held in its latched position.

The latch member 56 has a pivot opening 58 complementary to the cylindrical pivot member 52 on the corresponding rear side plate 27 and is retained thereon by a screw 60 threaded into a threaded axial bore 61 in member 52 and a washer 62. A spring washer 63 may be positioned between each latch member 56 and the rear side plate 27.

Figure 4:
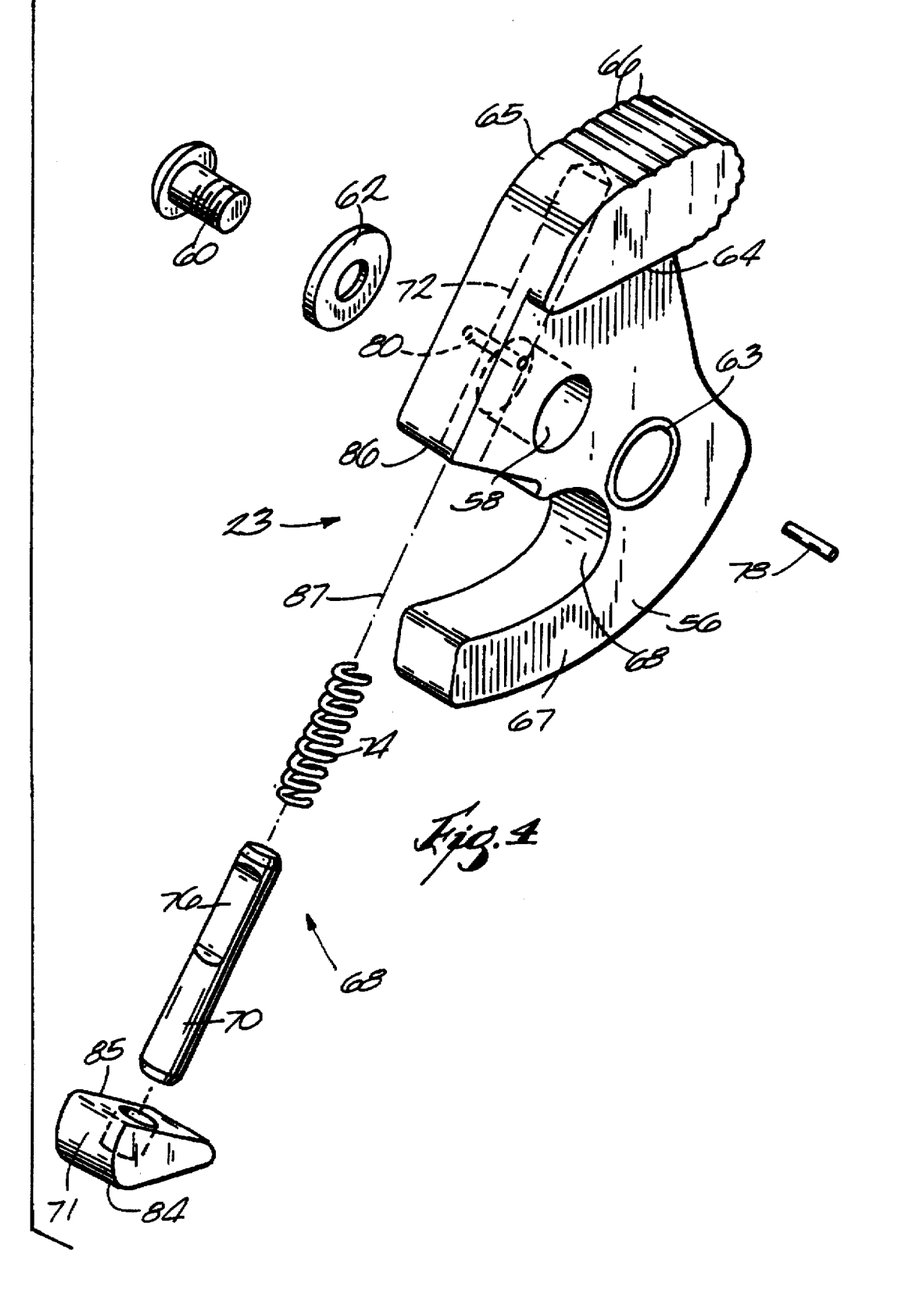
FIG. 4 is an exploded perspective view of the right side latch.

As seen in FIG. 4, each latch member 56 includes an overhanging lip 64 that interacts with the corresponding rear side plate 27 to limit rotation of the latch member 56 in both directions. A manually engageable portion 65 may be provided with serrations 66 to facilitate engagement of the latch member 56 by the user. Each latch member 56 further includes a hook portion 67 having a C-shaped latching surface 68 for latching the rear mounting means 12 within the rear recess 50, as will be described below.

Each locking device 68 includes a rod-like plunger member 70 and a cam member 71 suitably fixed to one end of member 70. The other end of plunger 70 is received for axial movement within a bore 72 formed in the latch member 56 and on the side of pivot opening 58 opposite the latching surface 68. A biasing spring 74 is positioned between the end of the plunger member 70 and the inner end of the bore 72 to bias the plunger member 70 outwardly. In the illustrated embodiment, the biasing spring 74 comprises a coil compression spring. The plunger member 70 includes the flattened keyway 76 designed to engage a pin 78 that laterally protrudes through a lateral opening 80 in bore 72 in the latch member 56. The interaction between the pin 78 and the keyway 76 prevents the plunger member 70 from exiting the bore 72.

The cam member 71 includes a cam surface 84 formed on its lower surface and at an oblique angle relative to a longitudinal axis 87 of the plunger member 70. The camming surface is designed to engage a mounting boss on the motorcycle frame 28 thereby rotating the latch member 56 about pivot member 52 and to a latched position, as described below in greater detail. The upper surface 85 of cam member 71 is generally planer and is complementary to a planer surface 86 formed in the forward end of latching member. 56.

Figure 7:
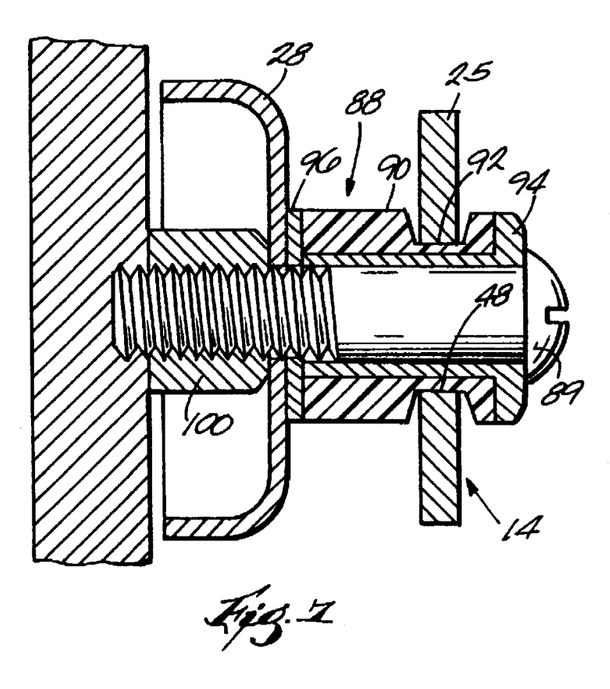
FIG. 7 is a section view of a front mount taken along line 7—7 in FIG. 2.

The recesses 48 and 50 in the front and rear side plates 25 and 27 are positioned to respectively engage front and rear mounting means 14 and 12 positioned in a spaced apart relation in any suitable portion of the motorcycle, such as the frame 28. More specifically, referring to FIG. 7, the illustrated front mounting means 14 includes two front mounting bosses 88 each constructed and arranged to receive a corresponding front recess 48. Each front mounting boss 88 includes a bolt 89 and a surrounding sleeve 90 made from any suitable polymer material, such as Delrin. The sleeve 90 includes a reduced diameter neck portion 92 for receiving the front recess 48. A metallic bushing 94 is positioned between the front sleeve 90 and the bolt 89. A washer 96 is positioned between the end of the sleeve 90 and the motorcycle frame portion 28. The bolt 89 may be secured to the motorcycle frame 28 portion in any suitable manner such as by a nut 100.

The illustrated rear mounting means 12 includes two rear mounting bosses 102 designed to accommodate rear recesses 50 and corresponding latch assemblies, as shown in FIG. 6. Each rear mounting boss 102 includes a threaded bolt 103 which is secured to the frame 28 by a nut 104. A sleeve 105 surrounds the bolt 103 and may also be formed of any suitable polymer material, such as Delrin. The sleeve 105 includes a reduced diameter neck portion 106 for receiving the rear recess 50 and the corresponding latching means 23. A bushing 108 is positioned between the sleeve 105 and the bolt 103, and a washer 110 is positioned between the end of sleeve 105 and the motorcycle frame 28.

To provide a location for mounting a saddle bag, longer studs 89 and 103 may be used and additional sleeves, such as 90 and 105, are butted against each existing sleeve 90, 105.

Figure 8:
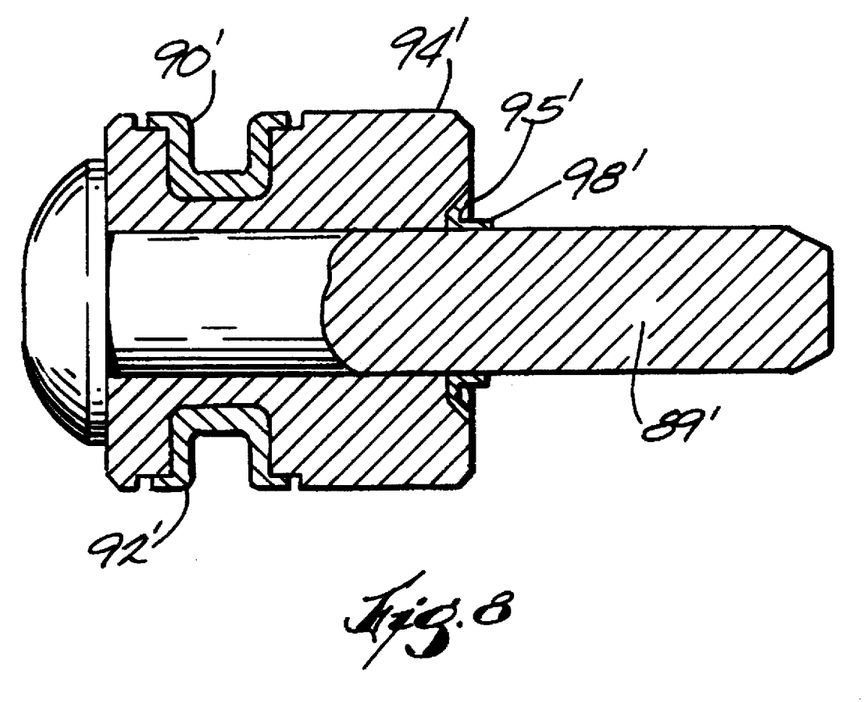
FIG. 8 is an alternate embodiment of the mounts shown in FIGS. 6 and 7.

An alternate embodiment of the mounting point 88 is shown in FIG. 8 to include a bolt 89' having a metallic bushing 94' received thereon. An annular groove 92' is formed in bushing 94' adjacent one end for receiving a plastic insert 90' which is molded within groove 92'. In addition, an annular grommet 95', formed of an elastomeric material is disposed in a groove formed in the base of bushing 94'. Grommet 95' includes a depending skirt portion 98' which surrounds the adjacent portion of bolt 89'. The mounting point 102 of FIG. 6 may be similarly constructed except that the groove 92' is wider to accommodate the rear recess 50 and the corresponding latching member 56.

Figure 9:
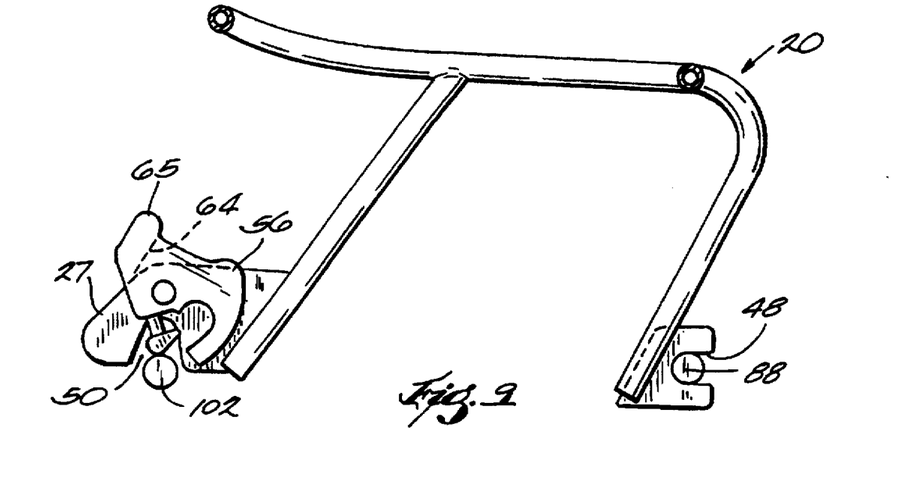
FIGS. 9–13 illustrate the operation of the latch as it is moved from an unlatched position to a latched position.
Figure 10:
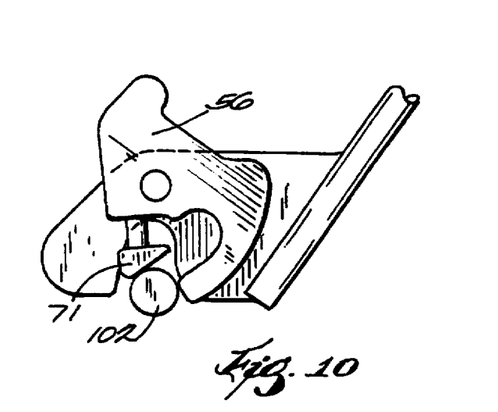
Figure 11:
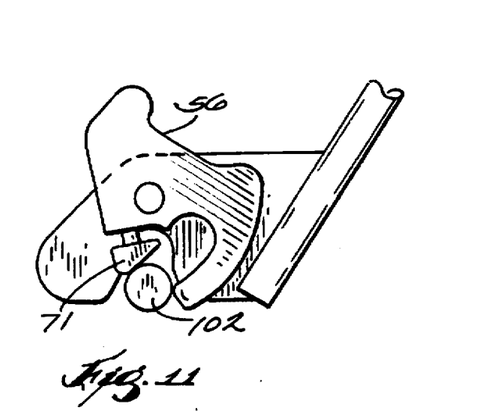
Figure 12:
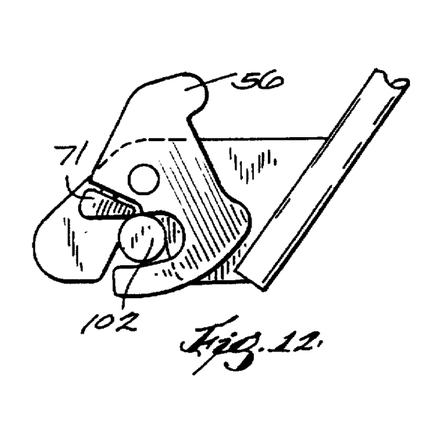

FIGS. 9–13 illustrate the manner in which the above-described luggage carrier assembly 10 is mounted onto front and rear mounting bosses 88, 102 of a motorcycle. First, the front recesses 48 are engaged with the front mounting bosses 88. With the front recesses 48 fully seated into the front mounting boss 88, the rear recesses 50 will be aligned with the rear mounting bosses 102, as illustrated in FIG. 9. The latch members 56 are then positioned by pulling back on the engaging portions 65 until the lips 64 contact the rear side plates 27. Next, the assembly is pivoted downwardly about the front mounting bosses 88 until the cam surfaces 84 of the cam members 71 contact the rear mounting bosses 102. The reaction force of spring 74 creates clockwise moments on latch members 56 which rotate until the leading edge of hook portion 67 engages the rear mounting boss 102. Subsequent downward movement of the rear side plates 27 results in compression of the spring 74 until the planer surface 85 of the cam member 71 engages the surface 86 on latch member 56. At this point, the cam surface 84 forms a continuation of the latch surface 68 so that the latching member is free for further clockwise rotation under the influence of compression of spring 74. Further downward movement of the rear side plate 27 causes further clockwise rotation of the latch member 56 until the hook portion 67 is below the rear mounting boss 102 and the cam surface 84 no longer contacts the rear mounting boss 102. At this point, the plunger member 70 is forced back to its fully-extended position under the influence of the biasing spring 74.

Figure 13:
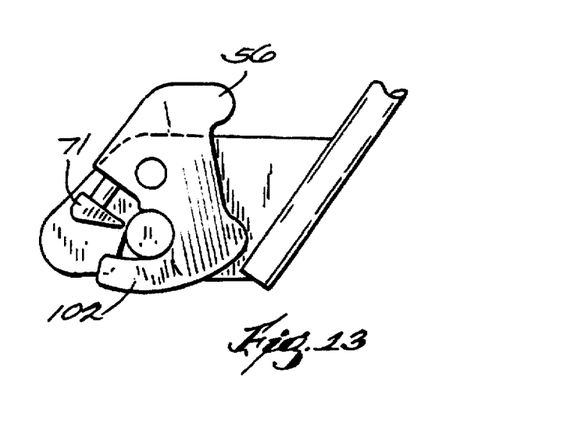

With the latch member 56 positioned on the rear mounting boss 102 as illustrated in FIG. 13, it can be seen that the latch member 56 is prevented from rotating counter clockwise due to the interference between the cam member 71 and the rear mounting boss 102. Accordingly, the rear side plates 27 are rigidly secured to the mounting bosses. To remove the luggage carrier assembly from the motorcycle, the cam members 71 are moved upwardly until each engages one of the surfaces 86 and the latch members 56 are subsequently rotated counter clockwise until the hook portion 67 on the latch member 56 no longer interfere with removal of the side plate 27 from the rear mounting boss 102.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A luggage carrier adapted to be removably installed on a motorcycle having a first mounting member and a second mounting member, said luggage carrier comprising:
   a luggage support portion;
   at least one pivot support connected to said luggage support portion and adapted to detachably pivotally engage the first mounting member;
   at least one latching support connected to said luggage support portion and spaced from said pivot support and adapted to engage the second mounting member;
   a latching member movably mounted on said latching support, and moveable between a latched position, where said latching support is secured to the second mounting member, and an unlatched position; and
   a locking member mounted for movement relative to said latching member, and moveable between a locked position, where said latching member is secured in the latched position, and an unlocked position.

2. The luggage carrier set forth in claim 1 wherein said latching member includes a lip engageable with said latching support to limit movement of said latching member relative to said latching support.

3. The luggage carrier as set forth in claim 1, wherein said locking member is displaceable from its locked position to its unlocked position upon engagement with the second mounting member.

4. A luggage carrier as set forth in claim 1, wherein said locking member is biased toward said locked position.

5. A luggage carrier as set forth in claim 1, wherein said locking member includes a cam portion engageable with the second mounting member such that said latching member is urged toward said latched position upon contact of said cam portion with the second mounting member.

6. A luggage carrier as set forth in claim 1, wherein said latching member includes a latching surface adapted to receive the second mounting member, and wherein said locking member is positioned adjacent to said latching surface, and wherein said locking member is adapted to rigidly prevent separation of said latching surface from the second mounting member when the second mounting member is received by said latching surface and said locking member is in said locked position.

7. A luggage carrier as set forth in claim, wherein said latching member is adapted to be urged toward said latched position after said locking member has contacted the second mounting member.

8. A luggage carrier as set forth in claim 1, wherein said locking member includes a shaft portion movably mounted on said latching member and a cam portion attached to said shaft portion.

9. A latching assembly adapted to engage a mounting member, said latching assembly comprising:
   a support,
   a latching member movably mounted on said support for movement between a latched position and an unlatched position, and
   a locking member mounted for movement relative to said latching member between a locked position, where said latching member is secured in the latched position, and an unlocked position, said locking member being biased toward said locked position,
   said locking member being adapted to move from said locked position to said unlocked position upon engagement of said locking member with the mounting member, and
   said latching member being adapted to pivot from said unlatched position to said latched position upon engagement of said locking member with the mounting member.

10. A latching assembly as set forth in claim 9, and wherein said cam portion is adapted to engage the mounting member such that said latching member is urged toward said latched position.

11. A latching assembly as set forth in claim 9, wherein said latching member includes a latching-surface adapted to receive the mounting member, and wherein said locking member is positioned adjacent to said latching surface, and wherein said locking member is adapted to rigidly prevent separation of said latching surface from the mounting member when the mounting member is received by said latching surface and said locking member is in said locked position.

12. A latching assembly as set forth in claim 9, wherein said latching member is adapted to be urged toward said latched position after said locking member has contacted the mounting member, and wherein said locking member is moveable into said locked position when said latching member is in said latched position, and wherein said locking member is adapted to rigidly prevent removal of said latching member from the mounting member.

13. A latching assembly as set forth in claim 9, wherein said locking member includes a shaft portion movably mounted on said latching member and a cam portion.

14. The latching assembly as set forth in claim 9, wherein said support includes an open-ended portion, and wherein said open-ended portion is adapted to receive the mounting member, and wherein said latching member is pivotally mounted adjacent said open-ended portion, and wherein said latching member is adapted to prevent separation of the mounting member from said support when the mounting member is received in said open-ended portion and said latch is in said latched position.

15. A latching assembly as set forth in claim 9, wherein said locking member is adapted to be biased toward said locked position upon continued pivotal movement of said latching member toward the mounting member after said locking member has contacted the mounting member.

16. The latching assembly as set forth in claim 11, wherein said latching member includes a pivot axis, and wherein said locking member is disposed on a side of said pivot axis opposite to said latching surface.

17. The combination of a motorcycle and a luggage carrier removably mounted on said motorcycle, said motorcycle including first and second spaced apart mounting means, said luggage carrier including:

means for releasably supporting luggage, pivot means mounted on said luggage carrier for pivotally engaging a first mounting means, latching means mounted on said luggage supporting means and spaced from said pivot means for engaging said second mounting means and for automatically securing said luggage supporting means to the first and second mounting means upon pivotal movement of said luggage supporting means about the first mounting means and towards said second mounting means and into an operative position, said first and second mounting means each including an elongate metallic member, a metallic bushing member surrounding the elongate member, an annular groove formed in each bushing member, and an annular plastic insert disposed in each groove , each plastic insert defining a groove for releasably retaining said pivot means or said latching means.

18. A mounting assembly for mounting and supporting a removable member on a motor vehicle, said mounting assembly comprising:

an elongated metallic member adapted to be mounted on a motor vehicle;

a metallic bushing member surrounding said elongated metallic member, said bushing member including an annular groove; and an annular non-metallic plastic insert positioned within said annular groove and defining a recess for releasably receiving a removable member to be mounted on the motor vehicle.

* * * * *

UNITED STATES PATENT AND TRADEMARK OFFICE
CERTIFICATE OF CORRECTION

PATENT NO.   : 5,664,715
DATED        : September 9, 1997
INVENTOR(S)  : Donald Michael Gogan, Stephen Lloyd Galbraith, Geoffrey Thomas Williams It is certified that error appears in the above-indentified patent and that said Letters Patent is hereby corrected as shown below:

Column 2, line 14, delete "ride side" and insert --right side--.

Column 3, line 52, delete "planer" and insert --planar--; and
          line 53, delete "planer" and insert --planar--.

Column 4, line 46, delete "moments" and insert --movement--; and
          line 50, delete "planer" and insert --planar--.

Column 5, line 2, delete "assembly" and insert --assembly 10--; and
          line 6, delete "interfere" and insert --interferes--.

Column 6, Claim 10, line 1, after "Claim 9," and before "and", insert --wherein said locking member includes a cam portion,--.

Signed and Sealed this

Seventeenth Day of February, 1998

Attest:

BRUCE LEHMAN

*Attesting Officer*          *Commissioner of Patents and Trademarks*